G. T. THATCHER.
MACHINE FOR SERRATING KNIFE BLANKS.
APPLICATION FILED APR. 10, 1919.
1,420,786.
Patented June 27, 1922.
6 SHEETS—SHEET 6.
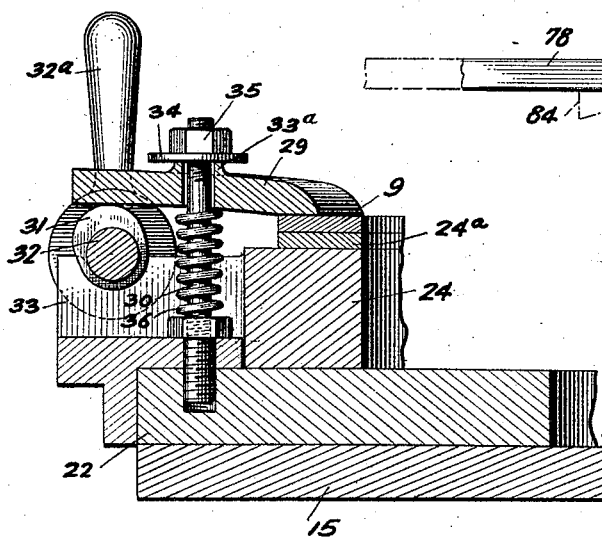
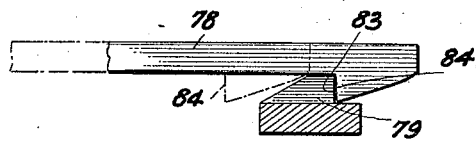
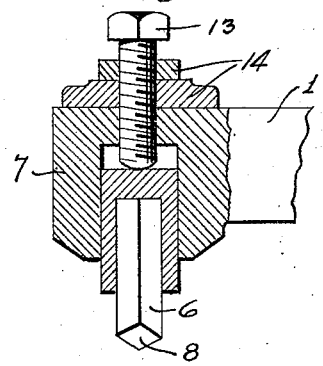
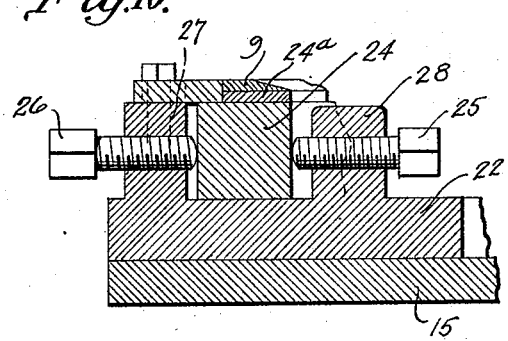
Inventor:
George T. Thatcher
By
Parsons & Bidell
Attorneys.

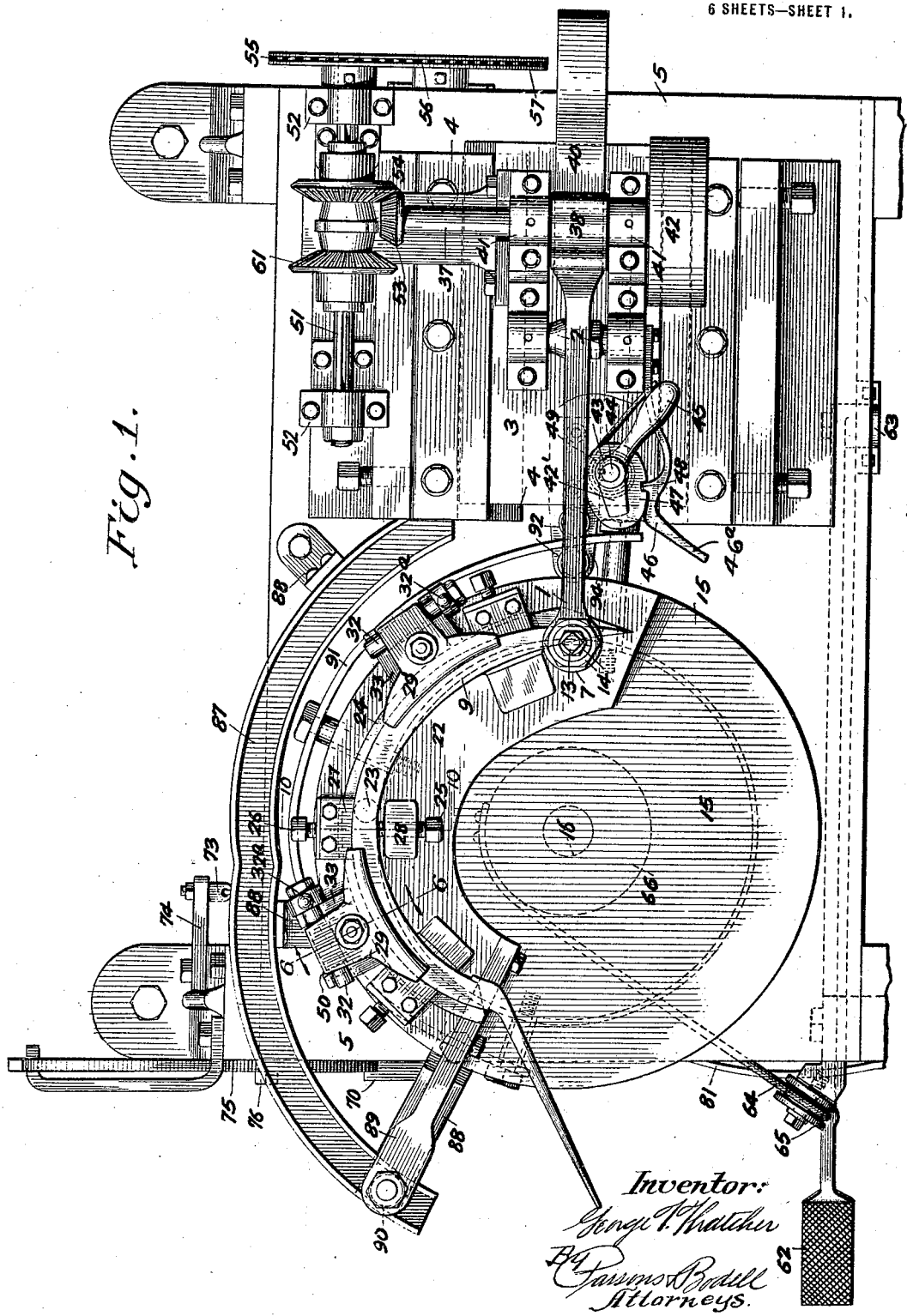

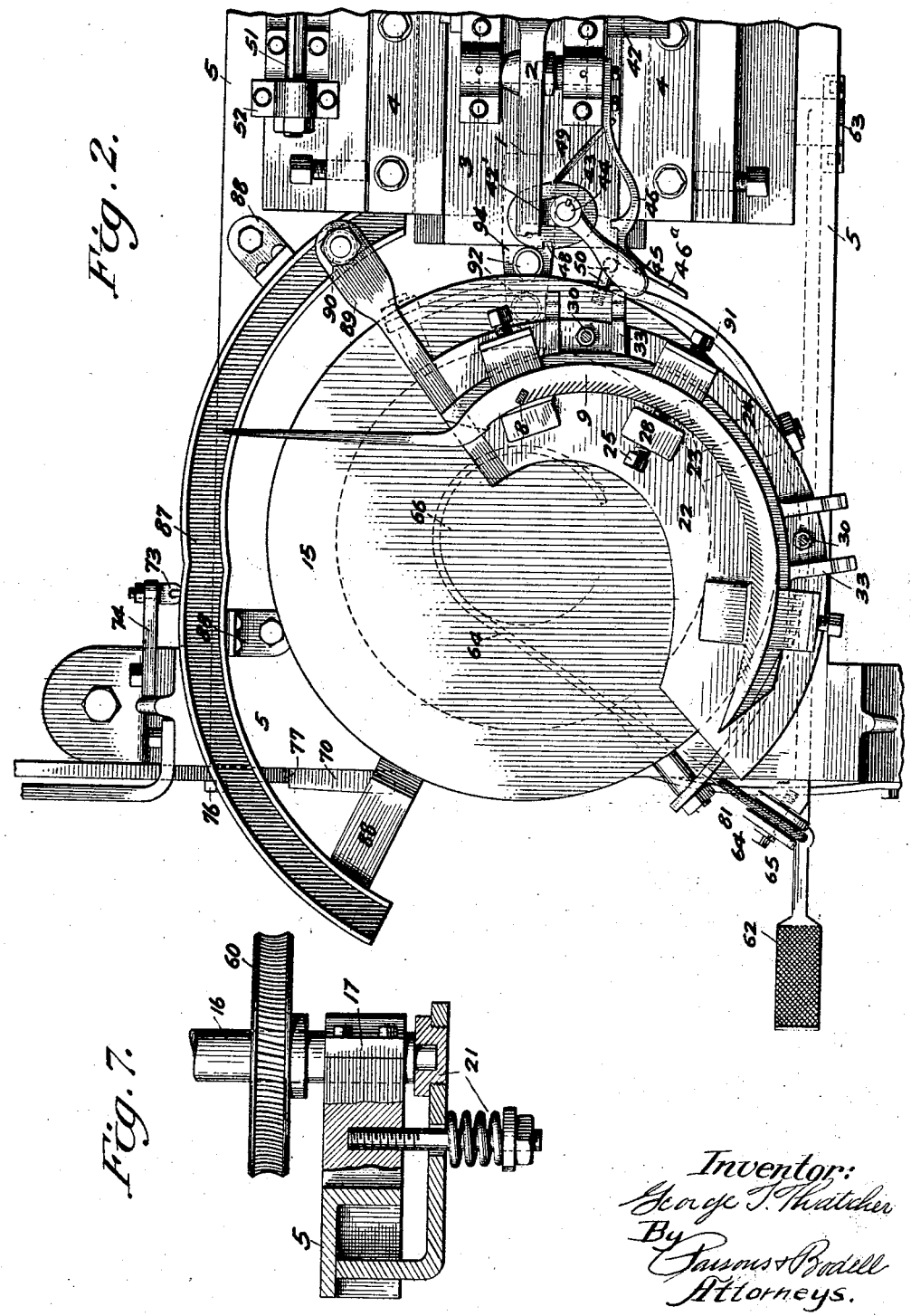

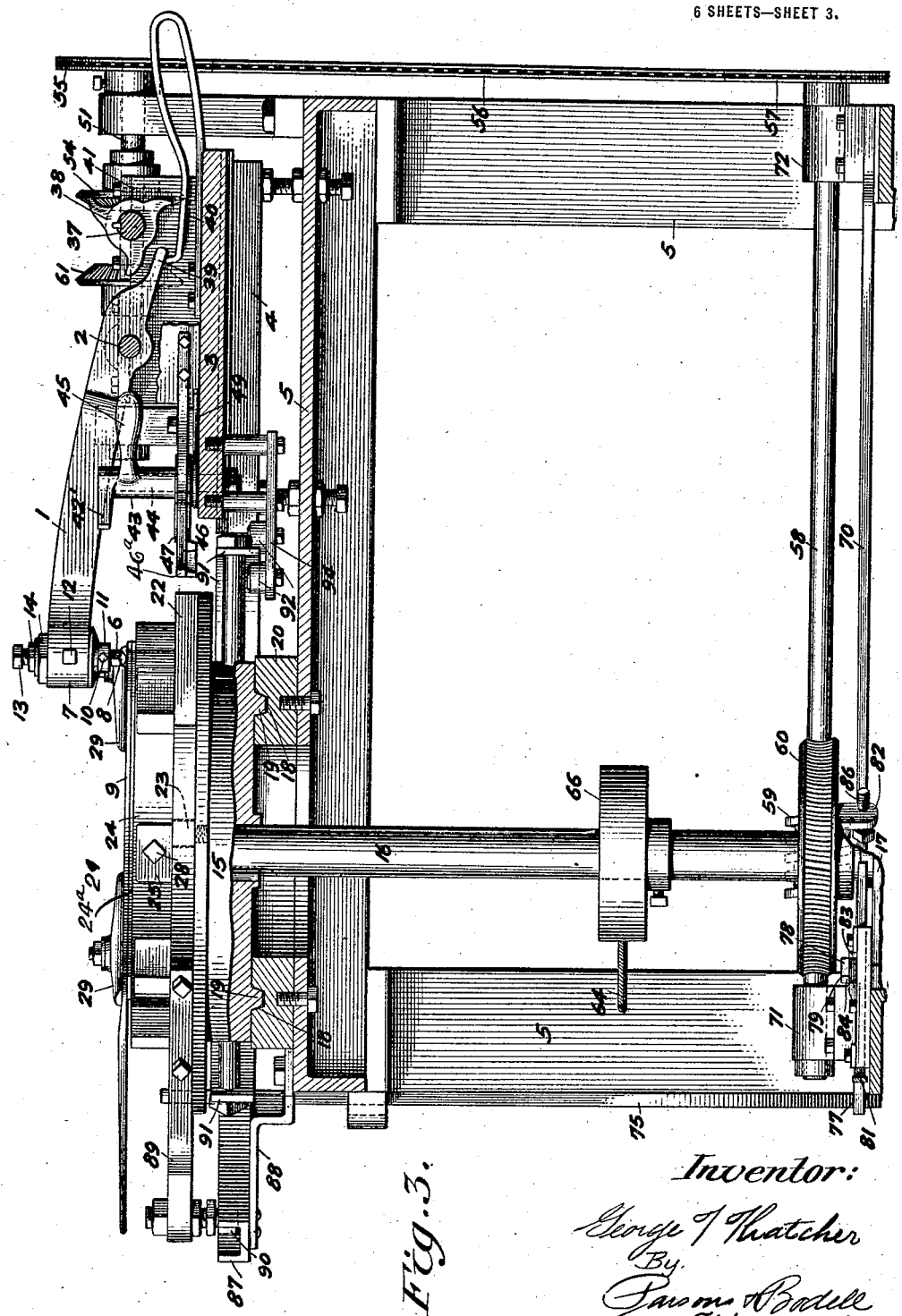

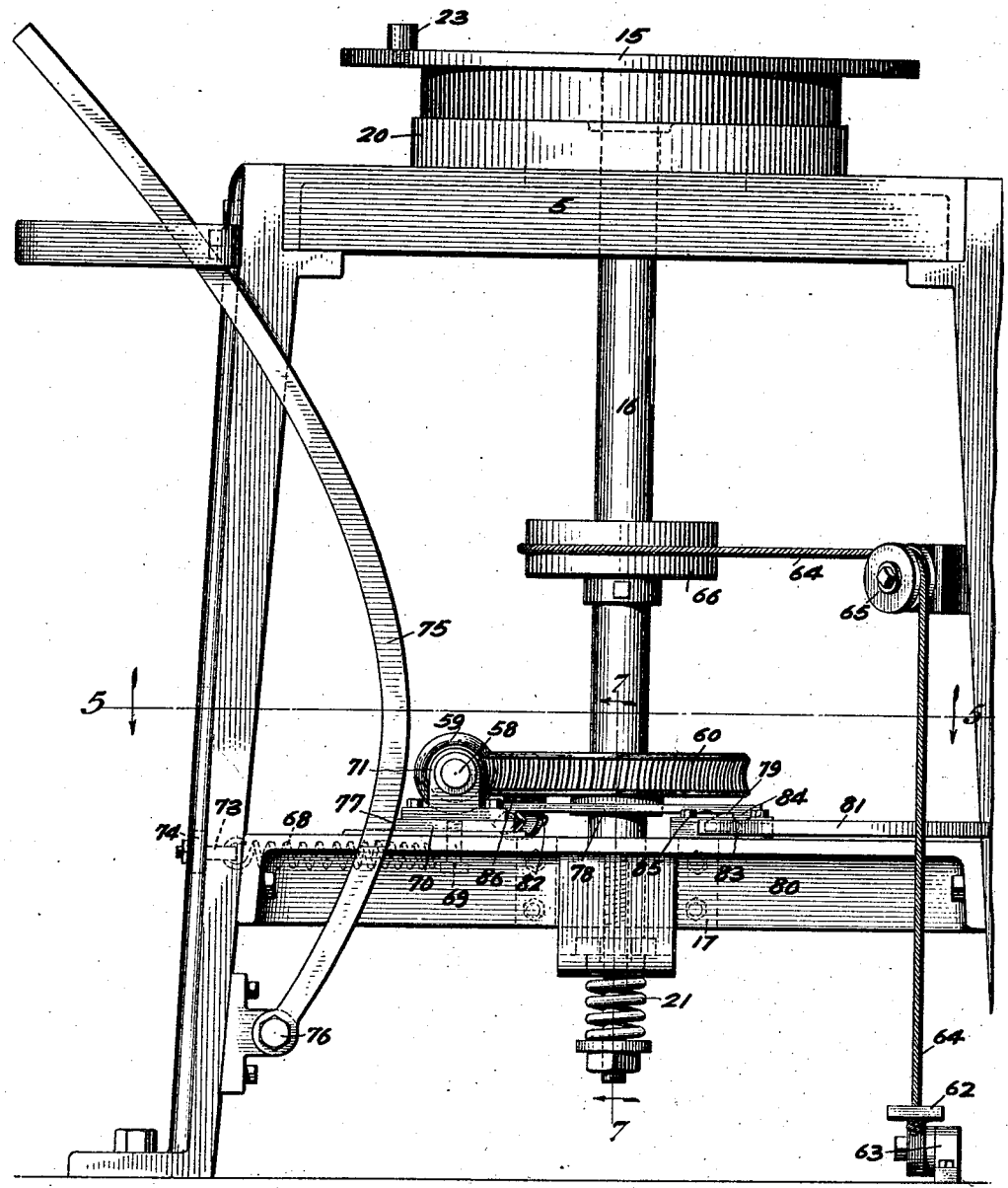

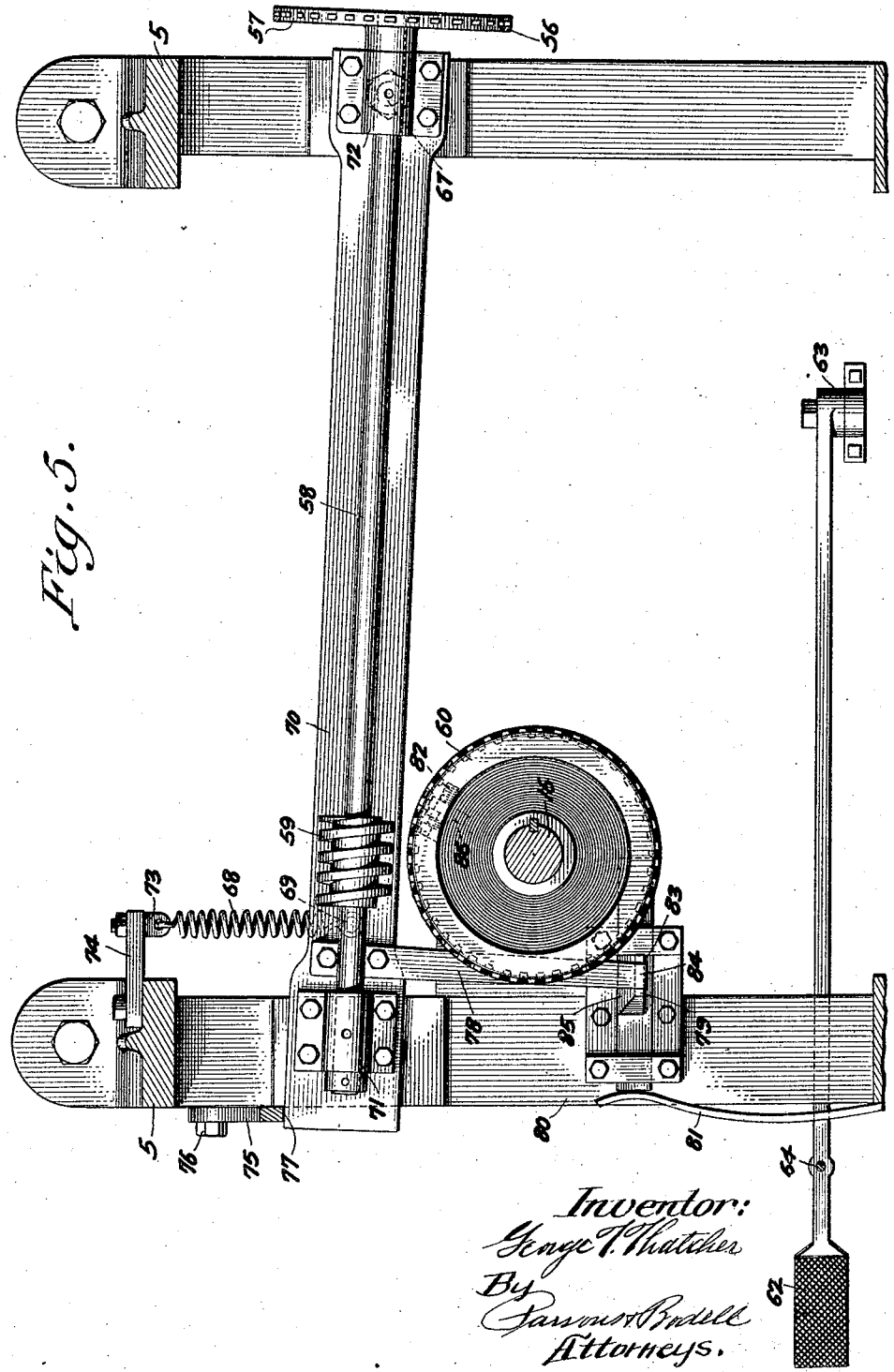

UNITED STATES PATENT OFFICE.

GEORGE T. THATCHER, OF AUBURN, NEW YORK.

MACHINE FOR SERRATING KNIFE BLANKS.

1,420,786.   Specification of Letters Patent.   Patented June 27, 1922.

Application filed April 10, 1919. Serial No. 289,000.

*To all whom it may concern:*

Be it known that I, GEORGE T. THATCHER, a citizen of the United States, and a resident of Auburn, in the county of Cayuga and State of New York, have invented a certain new and useful Machine for Serrating Knife Blanks, of which the following is a specification.

This invention has for its object a machine for serrating the edge of knife blades or blanks so that when the blanks are sharpened the cutting edge thereof is serrated or formed with sharp cutting teeth which machine is particularly simple in construction, rapid in operation and highly efficient and durable in use.

The invention consists in the novel features and in the combinations and constructions hereinafter set forth and claimed.

In describing this invention, reference is had to the accompanying drawing in which like characters designate corresponding parts in all the views.

Figure 1 is a top plan view of a preferable embodiment of my invention showing the position of the parts at the beginning of the serrating operation.

Figure 2 is a fragmentary top plan view, partly in section, illustrating the position of the parts after the serrating operation has been completed.

Figure 3 is a side elevation, partly in section and partly broken away.

Figure 4 is a front elevation, parts being omitted.

Figure 5 is a sectional view, parts being omitted taken on the plane of line 5—5, Fig. 4.

Figure 5ª is a detail view of parts seen in Fig. 5.

Figure 6 is a detail fragmentary view taken on the plane of line 6—6, Fig. 1, of the clamp for holding the knife blank on its support.

Figure 7 is a fragmentary sectional view illustrating the spring pressed step bearing for the actuating shaft of the rotatable carrier for the blank.

Figure 8 is a fragmentary sectional view of the tool holder.

Figure 9 is an enlarged cross sectional view of one form of knife blank as a sickle on which my machine is designed to produce a serrated edge.

Figure 10 is an enlarged detail view taken on line 10—10, Fig. 1.

This machine comprises generally, a movable carrier, a knife or knife blank support mounted on the carrier and movable therewith, a tool holder which carries a tool or die movable toward and from the blank during the movement of the carrier, mechanism for actuating the tool holder, and means for actuating the carrier to feed the blank to or under the tool during the movement of the tool holder.

This machine is particularly applicable for forming curved blanks or the blanks for grass hooks and sickles with serrations so that when the blanks are ground, the knife is provided with a sharp serrated edge; and as the curve of grass hooks and sickles is not an arc but is constantly changing, means is provided for shifting the holder or support for the blank relatively to the carrier as the carrier moves to feed the blank under the tool holder. Owing to the constantly changing curve of the blade, the carrier is movable about an axis and the blank holder or support is pivoted to the carrier eccentric to the axis thereof and shiftable on its pivot during the rotation of the carrier so that the cuts or indentations produced in the blank by the tool bear the same relation to and are at substantially the same angle to the edge of the blank throughout the length of the blade.

Also in order that the indentations or cuts of the tool will bear the proper angle and position to the edge of the blank, the tool holder is shiftable relatively to the carrier during the rotation of the carrier and pivotal movement of the blank support or holder.

The tool holder in this embodiment of my invention is here shown as a hammer 1 pivoted at 2 to a movable carriage 3 suitably mounted on a table 4 carried by the main frame 5 of the machine which frame may be of any suitable form, size and construction. The hammer is actuated as will be hereinafter described.

The tool 6 is carried in the head 7, at the front end of the hammer in any suitable manner, this tool being in the form of a cutter having a receding edge 8 of such incline as to conform to the incline of the blank 9, Figs. 1 and 9. The tool is held in position by means of a set screw or any other suitable device 10 extending into a sleeve or collar 11 held in the head 7 by a set screw 12 and surrounding the tool 8, and is adjusted to the proper depth by means of a screw 13 extending into the head from the top thereof and coacting with the collar 11. The tool is additionally held in its adjusted position by jamb nuts 14.

15 designates the carrier which is mounted on the outer end of a vertical shaft 16 journaled in a suitable bearing 17 in the frame 5 and is guided and sustained in its movement by means of ways or annular mortises and tenons 18 and 19 formed concentric with the axis of the carrier on the lower side of the carrier and in a bearing ring 20 mounted on the frame. The carrier is also spring supported to avoid undue friction at the guides 18, 19, the means comprising a spring pressed step bearing 21 at the lower end of the shaft 16.

22 designates the support or holder for the blank 9.

This support is here shown as pivotally mounted at 23 on the carrier eccentric to the axis thereof, the pivot being parallel to the axis or shaft 16 for the carrier. The support or holder is provided with an anvil block 24 on which the blank 9 is placed and the blank is held from movement relatively to the support by any suitable means.

This means includes guides for holding the anvil from lateral displacement and clamping devices for holding the blank onto the anvil 24.

The guiding means as here shown includes screws 25, 26 threading in blocks 27, 28 mounted on the support 22 on opposite sides of the anvil and movable into engagement with the anvil and the rear edge or heel of the blank. The clamping means for holding the blank on the anvil 24 comprises pivoted clamps 29, Fig. 6 arranged at suitable intervals and loosely mounted between their ends on posts 30 rising from a support 22, these clamps having a pivotal movement relatively to the post, one end of said clamp overhanging the anvil in position to engage the blank thereon, and the other end coacting with the means for effecting a positive pivotal movement, as a cam 31 mounted on a shaft 32 suitably carried in brackets 33 provided on the support 22, the shaft having a suitable handle lever 32ª. These clamping levers 29 have fulcrums 33ª between their ends which bear against shoulders as a washer 34 on the post 30, the washer being held in position by a nut 35. A spring 36 surrounding the post 30 exerts an upward pressure on the part 29 to press the same toward the nut 35. There are usually two of these clamps 29.

In operation, the anvil having the curve for the particular blanks to be operated on is positioned by the screws 25 and 26, the blank 9 placed thereon and clamped in position by operating the shafts 32. Preferably, a face plate 24ª of substantially the same shape as the blank is interposed between the blank and the anvil.

The actuating mechanism for the hammer 1 may be of any suitable form, size and construction and includes a main shaft 37 having a cam 38, Fig. 3 thereon formed with a plurality of lobes which coact with a tail 39 of the hammer to depress the same against the action of a returning spring 40 which actuates the hammer to cause the tool to strike the blank 9. This shaft is journaled in suitable bearings 41 carried by the carriage 3 and movable therewith. The shaft 37 is also provided with suitable means as a driving pulley 42, by which it is connected by a belt to a motor or other prime mover. The movement of the hammer 1 by the cam 38 is controlled by an operating member mounted on the carriage 3 and movable under the hammer to hold it in its elevated position, this member consisting of an arm 42' mounted on a bearing 43 which in turn is mounted upon a stud 44 rising from the carriage 3, the arm being preferably movable under the hammer to hold it in its elevated position. The bearing is provided with a suitable handle 45. The operating member is held in its inoperative position, that is, its position assumed when the hammer is permitted to be operated by the cam, by means of a spring pressed latch 46 coacting with a latch plate 47 on the lower end of the bearing 43 adjacent the carriage and movable into a notch 48 in said plate 47. The operating member is moved into its inoperative position under the hammer by means of a suitable spring 49. The latch 46 is tripped when the serrating operation of the knife blank is completed by a knockoff device 50 movable with the carrier 15. The latch is provided with a curved guard 46ª at its end with which the knockoff device 50 engages after it has tripped the latch, the guard preventing the knockoff device 50 from passing by the latch. The carrier 15 is actuated from the shaft 37 through suitable power transmitting mechanism here shown as including a shaft 51 mounted in suitable bearings 52 on the rear part of the frame supporting the hammer mechanism, this shaft being arranged at a right angle to the shaft 37, intermeshing bevel gears 53, 54 mounted on the shafts 37 and 51 respectively, a sprocket wheel 55 mounted on the shaft 51 at the rear end thereof, and a chain 56 running over the sprocket wheel 55 and the sprocket wheel 57 mounted on the rear end of a shaft 58, see Fig. 3, in the frame below the hammer mechanism and extending forwardly, this shaft 58 having a worm 59 at its forward end, see Fig. 5 meshing with the gear 60 mounted on the shaft 16, so that during rotation of the shaft 37 the motion is transmitted to the shaft 16 on which the carrier or rotary table 15 is mounted. The machine here illustrated is for operating on right hand sickles but when used to operate on left hand sickles the bevel gear 61 opposite to the gear 54 may be shifted into mesh with the gear 53 and the gear 54 shifted out of mesh with the gear 53.

The carrier 15 may be rotated in the opposite direction to that in which it is rotated by the gear 54 by shifting the gear 54 out of mesh with the gear 53 and shifting the bevel gear 61 on the shaft 51 into mesh therewith.

Preferably, the return of the movement of the carrier 15 is effected by means of a pedal 62, Figs. 2 and 4 pivoted at 63 to the frame and extending to the front side of the frame and a strap or cable 64 connected to the pedal and extending vertically therefrom and running over a pulley 65 suitably carried by the frame and around a drum 66 mounted on the shaft 16, and in order to permit the return movement of the carrier 15 by the pedal 62 means is provided for automatically disconnecting the carrier from its driving mechanism when the serrating operation is completed.

In the illustrated embodiment of my invention, the shaft 58 is shiftable laterally to carry the worm 59 out of mesh with the worm gear 60 on the shaft 16, the shaft 58 being pivoted at 67 at its rear end, see Fig. 5 in order to have a slight movement sufficiently to carry the worm 59 into and out of mesh with the worm gear 60.

The shifting movement of the shaft 58 to carry the worm 59 out of engagement with the worm gear 50 is effected by a suitable spring 68 connected at one end at 69 to the carrier 70 which carries the bearings 71 and 72 for the shaft and at its other end at 73 to a bracket 74 fixed to the front part of the main frame 5.

The lateral shifting movement of the shaft 58 and its carriage 70 is controlled by a hand lever 75, Fig. 4 movable laterally across the front of the machine and pivoted at 76 at its lower end to the frame and bearing at its intermediate portion at 77 against the front end of the carrier 70 for the shaft 58.

The shaft is locked in its position assumed when the worm 59 is in mesh with the worm gear 60, by suitable means, here shown as a latch 78, see Figures 5 and 6, extending laterally from the carrier 70 for the shaft 58 and coacting with a spring pressed lock 79 carried by the bar 80 at the front side of the frame and movable out of its operative position against the action of its spring 81 by a knock off device 82 located on the under side of the worm gear 60.

The lock 79 is here shown as a slide provided with a lock or shoulder 83 thereon with which a hook 84 on the end of the arm or latch coacts. This shoulder is formed with an inclined latching cam face 85 on one side thereof toward the shaft 58 with which the hook-shaped end 84 of the arm coacts when the shaft 58 and its carrier 70 are being moved into engagement by the lever 75 to engage the worm 59 with the worm gear 60. The hook shaped end rides up the inclined face 85 and snaps into engagement with the shoulder 83, when the shaft 58 and its carrier 70 are being shifted by the lever 75. While this is taking place, the worm 59 is moved into engagement with the worm gear 60 so that the worm gear is actuated and the table or carrier 15 rotated to feed the knife blank under the hammer, until the knock off device 82 engages the end of the lock 79 and forces the same to the left, Fig. 5 against the action of the spring 81 and releases the latch 78 so that the spring 68 again shifts the shaft 58 to carry the worm 59 out of mesh with the worm gear 60. This takes place after the serrating operation has been completed.

The knock off device is adjustable and is here shown as a screw threading through a lug 86 on the lower side of the worm gear 60.

The means for moving the support 22 on its pivot 23 during the rotation of the carrier 15 as here shown, comprises a cam 87 fixed to the frame by suitable brackets 88, Fig. 3 and the carrier 22 is provided at its free end with an arm 89 having a roller or wiper 90 engaging the cam. This cam is a compound cam in order to give such pivotal movement to the carrier 22 as the curve of the blanks requires, and said cam may be interchangeable with other means or cams to conform with different curves of blanks.

The means for moving the carrier 3 for the hammer forwardly and rearwardly in order to conform to the curve of the blank being operated on in this form of my machine comprises a cam 91, Figs. 1, 2 and 3 carried by the carrier 15 and movable therewith and slidably interlocked with the carrier 3. The cam 91 is shown as in the form of a curved track which moves between a pair of rollers 92, Fig. 3 carried by a bracket 94 suitably secured to the carriage 3.

In operation, the knife blank 9 is placed on its holder or support 22 when the parts are in their position shown in Fig. 1. The handle 45 is then operated to bring the arm 42 out from under the hammer and the lever 75 swung to the right, Fig. 4 to carry the worm 59 into the mesh with the worm gear 60, whereupon the carrier 15 rotates and feeds the knife or blank 9 under the hammer, and during this movement the arm 89 on the support or holder 22 and the roller 90 thereon travels along the fixed cam 87 and moves the holder 22 on its pivot 23 at the same time the cam 91 which rotates with the carrier 15 moves the hammer forwardly so that the indentations formed by the hammer on the blade are in proper position on the blank and have substantially the same angle to the edge of the blank throughout the length of the edge of the blank.

The serrating operation is completed when the parts reach the position shown in Fig. 2, whereupon the knock off device 50 rotatable with the carrier 15 and carried by the cam 91 engages the spring latch 46 of the hammer controlling lever and moves said latch out of the notch 48 of the cam 47 permitting the spring 49 to move the handle 45 and arm 42 to its inoperative position.

At the same time the knock-off device 82 provided on the worm gear 60, Fig. 5, engages the lock 79 and moves the same to the left in Fig. 2 to release the latch or arm 78 so that the spring 68 is free to shift the carrier 70 and shaft 58 on which the worm 59 is mounted to carry the worm 59 out of mesh with the worm gear 60. The parts may then be returned to their starting position by depressing the pedal 62 which through the strap 64 and drum 66 rotates the carrier 15 to its starting position.

The blank is then removed, a new one inserted in the machine, and the operation repeated. After the blanks are provided with the serrations they are sharpened and whenever resharpening is necessary the serrations are also produced owing to the cuts or indentations produced in the blank by the hammer.

What I claim is:

1. In a machine for serrating the edges of knife blanks, the combination of a support for the knife blank, a serrating tool and holder therefor, means for actuating the holder to carry the tool into and out of engagement with the blank, and means for shifting the tool holder relatively to the support for the blank during the serrating operation to locate the serrations on the blank relatively to the edge thereof, substantially as and for the purpose specified.

2. In a machine for serrating the edges of curved knife blanks, the combination of a support for the blank, a serrating tool and holder therefor movable toward and from the support in a direction at an angle to the plane of movement of the support, means for actuating the tool holder to engage the tool held thereby with the knife blank, and means for moving the support to feed the knife blank in a curved line, substantially as and for the purpose described.

3. In a machine for serrating the edges of curved knife blanks, the combination of a support for the blank, a serrating tool and holder therefor movable toward and from the support, means for actuating the tool holder to engage the tool held thereby with the knife blank, and means for moving the support to feed the knife blank in a curved line to the tool and additional means for shifting the blank laterally as it is fed by the former means to the tool to vary the curve of the feeding movement of the blank, substantially as and for the purpose specified.

4. In a machine for serrating the edges of curved knife blanks, the combination of a carrier movable about an axis, a support for the blank mounted on the carrier, a serrating tool and holder therefor movable toward and from the blank on the support in a direction at an angle to the plane of movement of the support and parallel to the axis of the carrier during the rotation of the carrier, and means for actuating the tool holder and the carrier, substantially as and for the purpose set forth.

5. In a machine for serrating the edges of curved knife blanks, the combination of a carrier movable about an axis, a support for the blanks mounted on the carrier and movable therewith, said support being also mounted on the carrier to have a movement relatively thereto, a serrating tool and holder therefor movable toward and from the support to carry the tool into and out of engagement with the blank, mechanism for operating the tool holder, means for moving the carrier about its axis, and means for moving the support relatively to the carrier during the movement of the support with the carrier about its axis, substantially as and for the purpose described.

6. In a machine for serrating the edges of curved knife blanks, a carrier movable about an axis, a support for the blank pivotally mounted on the carrier eccentric to the axis thereof, a serrating tool and holder therefor movable toward and from the support, mechanism for actuating the tool holder, and means actuating the carrier and moving the support on its pivot during the rotation of the carrier, substantially as and for the purpose specified.

7. In a machine for serrating the edges of curved knife blanks, the combination of a carrier, a support for the blank mounted on the carrier and movable relatively thereto during the movement of the carrier, a serrating tool and holder therefor, mechanism for actuating the tool holder to bring the tool into and out of engagement with the blank on the support, means for actuating the carrier, and means for effecting the movement of the support laterally relatively to the carrier during the movement of the support with the carrier to vary the line of the feeding movement of the support for the work, substantially as and for the purpose set forth.

8. In a machine for serrating the edges of curved knife blanks, the combination of a carrier, a support for the blank pivoted to the carrier on an axis arranged at an angle to the direction of movement of the carrier whereby the support moves laterally on its pivot relatively to the movement of the carrier, a serrating tool and holder therefor movable toward and from the support during the movements of the carrier and the support to carry the tool into and out of engagement with the blank, mechanism for operating the tool holder, means for actuating the carrier, and means for moving the support on its pivot relatively to the carrier during the movement of the carrier, substantially as and for the purpose described.

9. In a machine for serrating the edges of curved knife blanks, a carrier movable about an axis, a support for the blank pivoted to the carrier eccentric to the axis thereof, a serrating tool and holder therefor movable toward and from the support during the movement of the carrier and the support to carry the tool into and out of engagement with the blank, mechanism for actuating the tool holder, means for actuating the carrier, a stationary cam arranged adjacent the carrier, the support having means for engaging the cam during movement of the carrier, substantially as and for the purpose specified.

10. In a machine for serrating the edges of curved knife blanks, the combination of a support for the knife blank, a serrating tool and holder therefor, means for actuating the holder to carry the tool into and out of engagement with the blank, means for shifting the tool holder relatively to the support for the blank during the serrating operation and means for actuating the support to feed the blank to the tool, substantially as and for the purpose set forth.

11. In a machine for serrating the edges of curved knife blanks, the combination of a support for the knife blank, a serrating tool and holder therefor, means for actuating the holder to carry the tool into and out of engagement with the blank, means for shifting the tool holder relatively to the support for the blank during the serrating operation, and means for shifting the support during the shifting of the tool holder, substantially as and for the purpose described.

12. In a machine for serrating the edges of curved knife blanks, the combination of a support for the knife blank, a serrating tool and holder therefor, means for actuating the holder to carry the tool into and out of engagement with the blank, means for shifting the tool holder relatively to the support for the blank during the serrating operation, means for actuating the support to feed the blank to the tool, and means for shifting the support relatively to its feeding movement during the shifting of the tool holder and the feeding movement of the support, substantially as and for the purpose specified.

13. In a machine for serrating the edges of curved knife blanks, the combination of a frame, a carriage movable on the frame, a carrier movable about an axis, a support for the knife blank shiftably mounted on the carrier, a serrating tool and tool holder, the latter being mounted on the carriage and also having a movement toward and from the support to bring the tool into and out of engagement with the knife blank thereon, means for simultaneously actuating the tool holder, the carriage and the carrier and for shifting the blank support relatively to the carriage, substantially as and for the purpose set forth.

14. In a machine for serrating the edges of curved knife blanks, the combination of a frame, a carriage movable on the frame, a carrier movable about an axis, a support for the knife blank shiftably mounted on the carrier, a serrating tool and tool holder, the latter being mounted on the carriage and also having a movement toward and from the support to bring the tool into and out of engagement with the knife blank thereon, means for simultaneously actuating the tool holder, the carriage and the carrier and for shifting the blank support relatively to the carriage, connections between the carrier and the support, and the tool holder carriage to shift the same during the movement of the carrier, substantially as and for the purpose described.

15. In a machine for serrating the edges of curved knife blanks, the combination of a frame, a carriage movable on the frame, a carrier movable about an axis, a support for the knife blank shiftably mounted on the carrier, a serrating tool and tool holder, the latter being mounted on the carriage and also having a movement toward and from the support to bring the tool into and out of engagement with the knife blank thereon, a driving shaft, connections between the shaft and the tool holder to actuate the same, connections between the shaft and the carrier to move the carrier about its axis, a cam movable with the carrier and connected to the tool holder carriage, and a cam fixed relatively to the carrier, the blank support having means coacting with the fixed cam during the movement of the carrier about its axis, substantially as and for the purpose specified.

In testimony whereof, I have hereunto signed my name, at Syracuse, in the county of Onondaga, and State of New York, this 24th day of March, 1919.

GEORGE T. THATCHER.